UNITED STATES PATENT OFFICE.

RALPH W. KING, OF THE DALLES, OREGON, ASSIGNOR TO PACIFIC EVAPORATOR COMPANY, A CORPORATION OF OREGON.

EVAPORATED VEGETABLE PRODUCT.

1,259,635.    Specification of Letters Patent.    Patented Mar. 19, 1918.

No Drawing.    Application filed June 29, 1917.    Serial No. 177,813.

*To all whom it may concern:*

Be it known that I, RALPH W. KING, a citizen of the United States, residing at The Dalles, in the county of Wasco and State of Oregon, have invented new and useful Improvements in an Evaporated Vegetable Product, of which the following is a specification.

This invention relates to an improved vegetable product and consists in certain improvements therein as will be hereinafter fully described and pointed out in claims.

The object of the invention is an improved vegetable product which is evaporated and dehydrated, and having its structure in such condition that upon the application of moisture it will assume practically its original condition.

The invention relates to vegetables including fruits of different kinds, but is more specifically applied to potatoes.

In preparing potatoes as illustrative of my invention, the potatoes are first peeled and subjected to a salt solution, a 3% solution being preferable for this purpose and the salt used being common table salt or sodium chlorid.

The potatoes are then sliced preferably about one fourth (¼) inch in thickness and again subjected to a salt solution of the same percentage.

The potatoes are then subjected to a steam process. In the ordinary commercial practice, the potatoes are placed on trays and the steaming process is carried on with the potatoes so placed, the same trays being used in carrying potatoes through the evaporating process. In carrying out the steaming process, the potatoes are placed in a receptacle and subjected to a dry steam for a very short time ordinarily seven minutes, the temperature in the material being kept below a point which will break down the cells, or in other words at a temperature which will not affect the cooking of the potatoes. This is brought about by the short period to which the material is subjected to the steam and the temperature of the material at the beginning of the process. For potatoes this temperature should be only sufficient to set the starch and should not be materially above 156°.

After the steaming process, the potatoes still remaining on the trays are run through an evaporator and the moisture extracted. This is accomplished by using air with atmospheric humidity. The temperature in the evaporator is carried below 156° and above 125° Fahrenheit, thus preventing the breaking down of the cells in the evaporator or the molding of the product. Vegetables and particularly potatoes forming the product of the process above described, return very closely to their usual color and quality when again subjected to moisture.

What I claim as new is:

1. As an article of manufacture, a steamed uncooked vegetable product having discoloration arrested through the action of a salt solution and its moisture evaporated.

2. As an article of manufacture, a steamed uncooked potato having discoloration arrested through the action of a salt solution and its moisture evaporated.

In testimony whereof I have hereunto set my hand.

RALPH W. KING.